(12) United States Patent
Sakae

(10) Patent No.: US 9,023,515 B2
(45) Date of Patent: *May 5, 2015

(54) ELECTRODE TERMINAL AND METHOD FOR PRODUCING ELECTRODE TERMINAL

(75) Inventor: Akira Sakae, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 287 days.

This patent is subject to a terminal disclaimer.

(21) Appl. No.: 13/579,756

(22) PCT Filed: Mar. 24, 2011

(86) PCT No.: PCT/JP2011/057258
§ 371 (c)(1),
(2), (4) Date: Aug. 17, 2012

(87) PCT Pub. No.: WO2011/122455
PCT Pub. Date: Oct. 6, 2011

(65) Prior Publication Data
US 2012/0315807 A1    Dec. 13, 2012

(30) Foreign Application Priority Data
Mar. 29, 2010 (JP) .................................. 2010-075916

(51) Int. Cl.
*H01M 2/02*    (2006.01)
*H01M 2/30*    (2006.01)
(Continued)

(52) U.S. Cl.
CPC ............... *H01M 2/305* (2013.01); *H01M 2/30* (2013.01); *H01M 2/20* (2013.01); *H01M 2/206* (2013.01); *H01M 2/307* (2013.01); *H01M 10/052* (2013.01); *Y02T 10/7011* (2013.01)

(58) Field of Classification Search
CPC .................................. H01M 2/30; H01M 2/20
USPC .......................................................... 429/178
See application file for complete search history.

(56) References Cited

U.S. PATENT DOCUMENTS

| | | |
|---|---|---|
| 2,806,215 A | 9/1957 | Redslob |
| 6,156,452 A | 12/2000 | Kozuki et al. |

(Continued)

FOREIGN PATENT DOCUMENTS

| | | |
|---|---|---|
| CN | 1241303 A | 1/2000 |
| CN | 1770504 A | 5/2006 |

(Continued)

OTHER PUBLICATIONS

U.S. Appl. No. 13/635,470, filed Sep. 17, 2012, Sakae, et al.

(Continued)

*Primary Examiner* — Jane Rhee
(74) *Attorney, Agent, or Firm* — Oblon, McClelland, Maier & Neustadt, L.L.P.

(57) ABSTRACT

The disclosed electrode terminal, which is used with batteries of which a positive output terminal and a negative output terminal are formed from metals dissimilar to each other, has excellent mechanical strength and can suppress electrical resistance while preventing galvanic corrosion. The electrode terminal (1) for power output is used with batteries (2) of which a pair of output terminals are each formed from a different metal, and has: a solid cylindrical shaft (10) that attaches to one output terminal and that is formed from the same metal as the one output terminal; and an outer cylinder (11) that connects with the cylindrical shaft (10) and that is formed from the same metal as the other output terminal. The shaft (10) and the outer cylinder (11) are unified by means of metallic bonding.

3 Claims, 6 Drawing Sheets

(51) Int. Cl.
*H01M 2/20* (2006.01)
*H01M 10/052* (2010.01)

(56) References Cited

U.S. PATENT DOCUMENTS

| | | | | |
|---|---|---|---|---|
| 2005/0100785 | A1* | 5/2005 | Enomoto et al. | 429/174 |
| 2006/0094289 | A1 | 5/2006 | Kim et al. | |
| 2010/0248005 | A1* | 9/2010 | Byun | 429/158 |

FOREIGN PATENT DOCUMENTS

| | | |
|---|---|---|
| CN | 201117707 Y | 9/2008 |
| JP | 57 90224 | 6/1982 |
| JP | 11 195434 | 7/1999 |
| JP | 2002 373638 | 12/2002 |
| JP | 2003 163039 | 6/2003 |
| JP | 2006 128114 | 5/2006 |
| JP | 2009 87721 | 4/2009 |
| JP | 2009 259424 | 11/2009 |

OTHER PUBLICATIONS

U.S. Appl. No. 13/810,939, filed Jan. 18, 2013, Sakae.
International Search Report Issued Apr. 26, 2011 in PCT/JP11/057258 Filed Mar. 24, 2011.

* cited by examiner

ELECTRODE TERMINAL AND METHOD FOR PRODUCING ELECTRODE TERMINAL

TECHNICAL FIELD

The present invention relates to an electrode terminal preferably used for a battery having a plus output terminal and a minus output terminal formed from metals dissimilar to each other, and a method for producing the electrode terminal.

BACKGROUND ART

Multiple battery cells configured as a battery pack by serially connecting a positive electrode of one of the battery cells and a negative electrode of another battery by a busbar is known as a battery installed on an electric vehicle and a hybrid vehicle (refer to a Patent Document 1, for example). Such a battery pack is characterized by a high output and a high energy density, and lithium ion batteries are used as the battery cells in most cases. The lithium ion battery has a plus output terminal formed by aluminum (Al) as a raw material, and a minus output terminal formed by copper (Cu) as a raw material.

There is a busbar (component for distribution of electric energy) as a component for connecting the terminals of the battery cells with each other. There is a manufacture of laser-welding members constructing busbars to each other as a method for producing the busbar as disclosed in "Technical Problem" of the Patent Document 2.

CITATION LIST

Patent Document

Patent Document 1: Japanese Patent Application Laid-Open No. 2002-373638
Patent Document 2: Japanese Patent Application Laid-Open No. 2003-163039

SUMMARY OF INVENTION

Technical Problem

As described before, if battery cells are serially connected to each other, the plus output terminal (aluminum) and the minus output terminal (copper) are connected with each other by the busbar. As a result, whether the busbar is formed from aluminum or copper, the busbar and one of the terminals always constitute a connection of dissimilar metals.

It is well known that if dissimilar metals are connected with each other, water in the air generally causes galvanic corrosion (electrochemical corrosion). Thus, as the galvanic corrosion progresses, the electrical conduction between the busbar and the terminal is disconnected, or the busbar itself or the terminal itself is damaged, and such a serious problem that an electric vehicle cannot be started is finally reached.

Though a manufacture of a busbar by joining an aluminum piece and a cupper piece to each other by laser welding, for example, is proposed as described in the Patent Document 2 as a countermeasure for this problem, eutectic is generated by the two types of metal on a laser-welded portion on a busbar made according to this method on a trial basis, this causes defects such as an excessive electric resistance, or an extreme decrease in mechanical strengths (particularly brittleness and tensile strength), and the busbar was not practically used.

In other words, not only improvement of the busbar, but also improvement and development of other members such as an electrode terminal provided for a battery cell is indispensable in order to fundamentally solve the problem.

The present invention is devised in view of the above-mentioned problem, and has an object of providing an electrode terminal which is used for a battery having a plus output terminal and a minus output terminal formed from metals dissimilar to each other, can prevent galvanic corrosion, restrains an electric resistance, is excellent in mechanical strength, and has high performance and high reliability, and a method of producing the electrode terminal.

Solution to Problem

In order to attain the object, the electrode terminal according to the present invention is an electrode terminal for electric power output used for a battery having a pair of output terminals formed from metals dissimilar to each other, including a first connection portion connected to one output terminal, and formed from the same metal as of the one output terminal, and a second connection portion connected to the first connection portion, and formed from the same metal as of the other output terminal, where the first connection portion and the second connection portion are unified by means of metallic bonding.

Preferably, the first connection portion is a shaft in a solid cylindrical shape, and the second connection portion is an outer cylinder in a cylindrical shape fit over the shaft.

The "metallic bonding" refers to a state in which a bonding interface at which dissimilar metals to be bonded are in close contact with each other at a metal structure level, and the electric conductivity and the mechanical bonding strength are consequently increased to "values suitable for practical use as an electrode terminal".

More preferably, a male thread portion is formed on an outer peripheral surface of the outer cylinder.

The outer cylinder may be formed so as to extend exceeding the length of the shaft in a direction opposite to a protruding side of the shaft.

If the electrode terminal is used for a plus output terminal of a lithium ion battery, the shaft is formed from aluminum or aluminum alloy, and the outer cylinder is formed from copper or copper alloy.

If the electrode terminal is used for a minus output terminal of a lithium ion battery, the shaft is formed from copper or copper alloy, and the outer cylinder is formed from aluminum or aluminum alloy.

On the other hand, when the above-described electrode terminal is produced, it is essential to employ a production method of providing source materials facing each other in a state in which a metal source material forming the outer cylinder is wound so as to surround a metal source material forming the shaft, and applying an extrusion process or a drawing process to the source materials facing each other by means of a die in a hydrostatic pressure environment at a high pressure.

The employment of this production method enables to unify the metal material forming the shaft and the metal material forming the outer cylinder by means of the metallic bonding, thereby producing an electrode terminal without presenting galvanic corrosion and the like.

Advantageous Effects of Invention

The use of this electrode terminal causes a plus output terminal and a minus output terminal of a battery to be the same metal when viewed from outside, a connection using a wire and a busbar made from the same metal as of the terminal can restrain the galvanic corrosion on terminal joint portions, and an increase in electric resistance caused thereby, resulting in an increase in reliability as a battery pack. In addition, in a preferred embodiment, the shaft and the outer cylinder of the electrode terminal are unified by means of the metallic bonding, and galvanic corrosion and an increase in electric resistance caused thereby in a bonded portion do not occur.

According to the present invention, the high-performance and high-reliability electrode terminal which is preferred for a battery having a plus output terminal and a minus output terminal formed by dissimilar metals, which can restrain the electric resistance while preventing the galvanic corrosion, and is excellent in mechanical strength can be realized.

DESCRIPTION OF EMBODIMENTS

A description will now be given of embodiments of the present invention with reference to drawings.

First Embodiment

Figure 1:
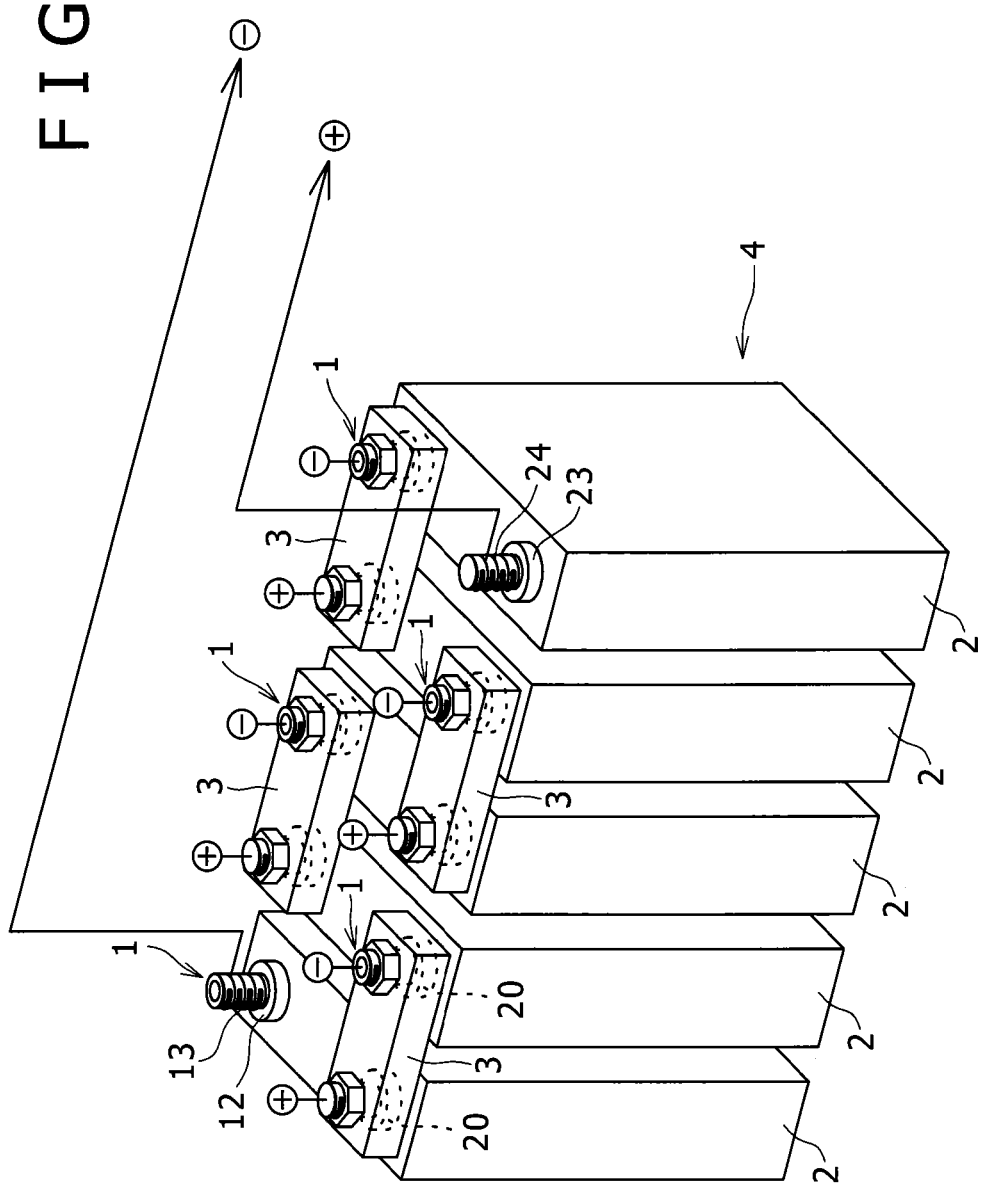
FIG. 1 A perspective view of a used form of electrode terminals according to a first embodiment.
Figure 2A:
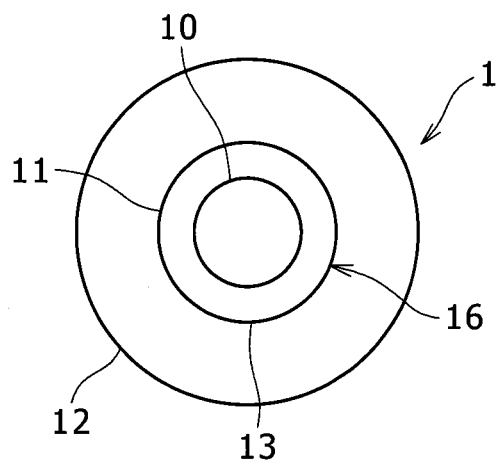
FIG. 2A A plan view of the electrode terminal according to the first embodiment.
Figure 2B:
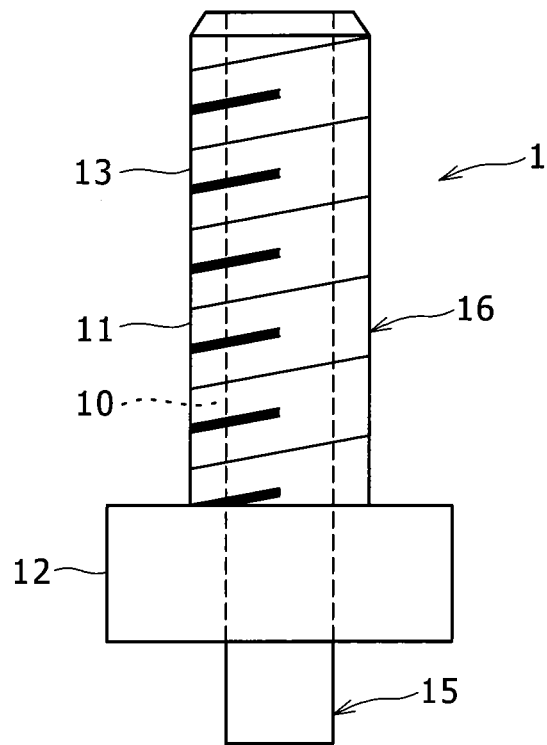
FIG. 2B A front view of the electrode terminal according to the first embodiment.
Figure 3:
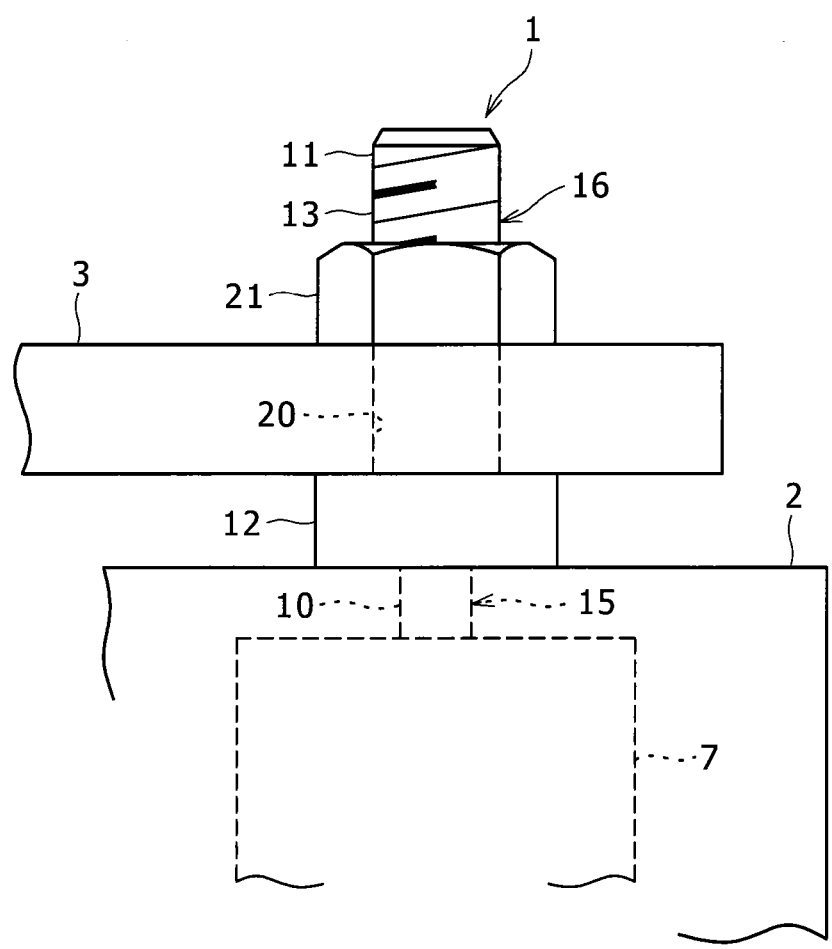
FIG. 3 A connection state of the electrode terminal according to the first embodiment and a busbar.

FIG. 1 to FIG. 3 show a first embodiment of an electrode terminal 1 according to the present invention. As shown in FIG. 1, the electrode terminal 1 can be used as a minus output terminal (minus output side) of each of battery cells 2, for example, in a battery pack 4 and the like constructed by serially connecting the multiple battery cells 2 by busbars 3.

As shown in FIG. 3, the battery cell 2 is a lithium ion battery, and the minus output terminal is formed from copper or copper alloy. This is because a negative-electrode-side carrier 7 (base body for fixing electrons and ions) connected to the minus output terminal inside the battery is formed from copper or copper alloy. In relation to a positive-electrode-side carrier, the plus output terminal (plus output side) is formed from aluminum or aluminum alloy.

As shown in FIG. 2A and FIG. 2B, the electrode terminal 1 according to the present invention adopted as the minus output terminal is formed into inner/outer double shafts by a shaft 10 (first connection portion) and an outer cylinder 11 (second connection portion) fitting over and covering the shaft 10.

A lower-end side of the shaft 10 protrudes from the outer cylinder 11 in the axial direction. An upper-end side of the shaft 10 and an upper end portion of the outer cylinder 11 are aligned to the same level in height. The shaft portion 10 is a round shaft, and the outer cylinder 11 is formed into a cylindrical shape. In other words, a shape on a cross section orthogonal to the axial direction of the shaft 10 and the outer cylinder 11 presents a double circle, and the thickness of the outer cylinder 11 surrounding the shaft 10 is approximately constant.

A base portion 12 is formed in a lower-end side of the outer cylinder 11, and the shaft 10 protrudes downward so as to pass through the base portion 12. Moreover, a male thread portion 13 is formed on an outer peripheral surface of the outer cylinder 11 except for the base portion 12.

The base portion 12 serves to maintain a constant length of the male thread portion 13 protruding from the battery cell 2 when the electrode terminal 1 is attached to the battery cell 2, or serves as a spacer for holding a busbar 3 lifted above the battery cell 2 when the busbar 3 is connected to the male thread portion 13. The base portion 12 is not always necessarily provided integrally with the outer cylinder 11, and may be provided as a separate member.

According to the first embodiment, the maximum diameter of the electrode terminal 1 (corresponding to an outer diameter of the base portion 12) is 5-25 mm, and the maximum length (corresponding to an overall length of the shaft 10) is 10-100 mm. The nominal outer diameter of the male thread portion 13 provided on the outer cylinder 11 is 4-12 mm.

The shaft 10 and the outer cylinder 11 are formed from metal having forming materials different from each other. The shaft 10 is formed by the same metal as of the negative-electrode-side carrier 7 of the battery cell 2, namely copper or copper alloy. Moreover, the outer cylinder 11 is formed by the same metal as of a positive-electrode-side carrier and the plus output terminal of the battery cell 2, namely aluminum or aluminum alloy as a source material.

A bonding interface in which the metal (Cu) of the shaft 10 and the metal (Al) of the outer cylinder 11 are brought in close contact with each other at a metal structure level by imparting deformation at an extreme high pressure (approximately 1000 MPa, for example) is formed in a gap between an outer peripheral surface of the shaft 10 and an inner peripheral surface of the outer cylinder 11, and, as a result, the gap is brought into a state in which the electric conductivity and the mechanical bonding strength are increased to "values proper for practical use as an electrode terminal".

When such an electrode terminal 1 is attached to the battery cell 2, a portion of the shaft 10 protruding from the outer cylinder 11 is used as an internal connection portion 15. In other words, the internal connection portion 15 is electrically connected to the negative-electrode-side carrier 7 of the battery cell 2. Moreover, the portion of the outer cylinder 11 on which the male thread portion 13 is provided is used as an external connection portion 16. In other words, one end portion of the busbar 3 made of aluminum, which is the same metal as the outer cylinder 11, is connected to the external connection portion 16.

Specifically, connection holes 20 are provided on both end portions of the busbar 3 as shown in FIG. 1 and FIG. 3, the connection hole 20 is inserted over the external connection portion 16 (the male thread portion 13 of the outer cylinder 11) of the electrode terminal 1, and an aluminum nut 21 made of the same metal as of the outer cylinder 11 is threadedly engaged with the male thread portion 13 which is passing through the connection hole 20.

On this occasion, the external connection portion 16, the busbar 3, and the nut 21 constitute a connection of the same metal, which does not cause galvanic corrosion. In addition, though the dissimilar metals are present between the internal connection portion 15 and the external connection portion 16 (between the shaft 10 and the outer cylinder 11), they are metallically bonded, do not cause galvanic corrosion, and are kept in a state in which the electric resistance is restrained.

On the other hand, the plus output terminal preferably employs an electrode terminal in which all forming materials are formed from aluminum or aluminum alloy. The shape thereof is approximately the same as the electrode terminal 1, and includes a base portion 23 and a male thread portion 24. Therefore, the connection hole 20 on the other side of the busbar 3 is inserted over the male thread portion 24 of the electrode terminal on the plus side, and the nut 21 is threadedly engaged with the male thread portion 24, which is passing through the connection hole 20. It should be understood that connection portions between the plus output terminal and the busbar 3 constitutes a connection of the same metal, which does not cause galvanic corrosion.

As a result, in the battery pack 4 constructed by serially connecting the multiple battery cells 2 via the busbars 3, galvanic corrosion is not generated in any of the connection portions, and a highly efficient electric conductivity is maintained. Moreover, the electrode terminal 1 is excellent in mechanical strength, and the electrode terminal 1 is not bent or broken in an ordinary state of use.

It should be noted that the busbar 3 is formed from aluminum or aluminum alloy according to the first embodiment, is light in weight, and can restrain the weight of the battery pack 4 to a small value. As a result, the battery pack 4 is advantageous in weight reduction of an electric vehicle carrying the battery pack 4 as a battery.

Figure 4:
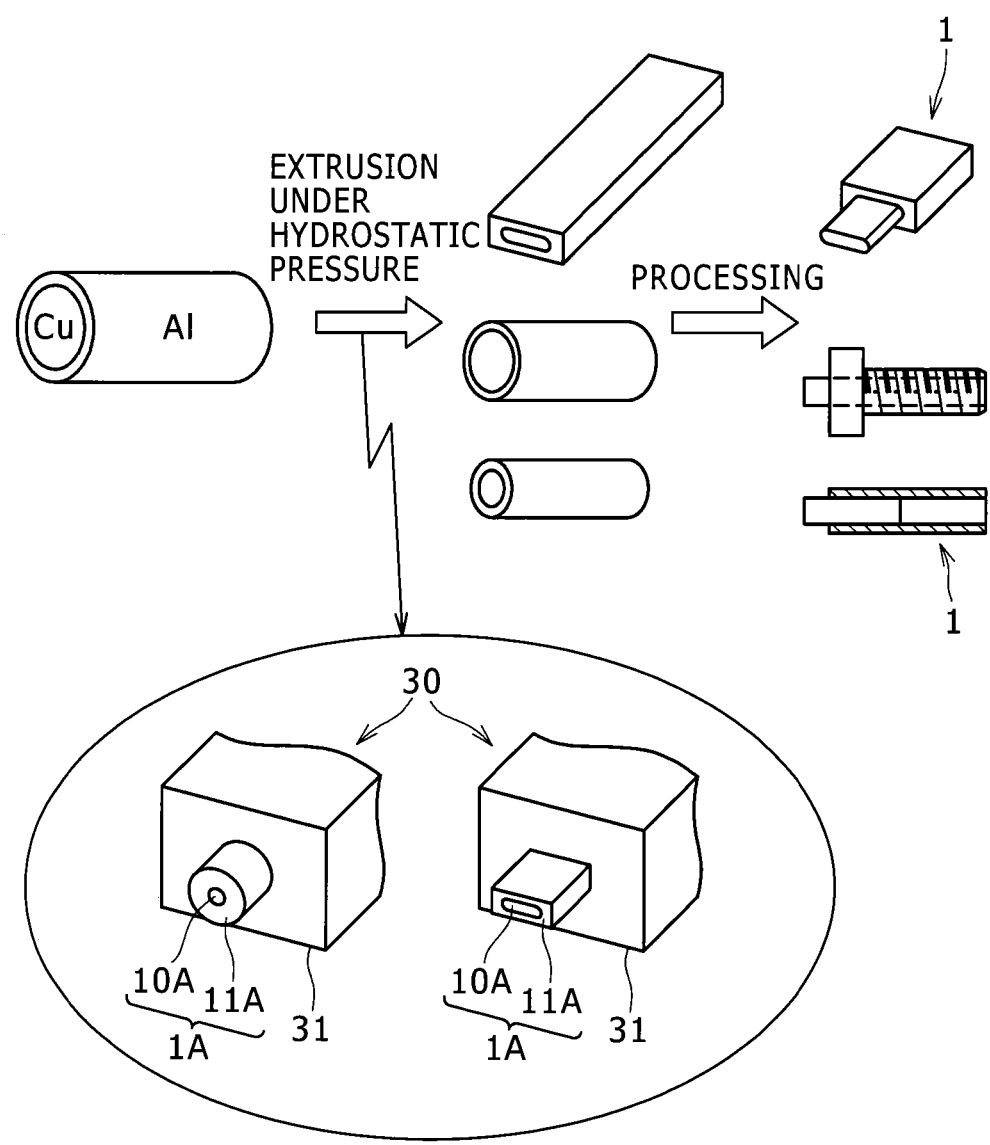
FIG. 4 A perspective view describing a process of producing an electrode terminal according to the present invention.

An extrusion process is carried out under a hydrostatic pressure at an extremely high pressure in order to produce the electrode terminal 1 constituted in this way as shown in FIG. 4. An extrusion device 30 used for this process includes a die 31 having a single opening corresponding to the maximum diameter of the electrode terminal 1 (corresponding to the outer diameter of the base portion 12) to be obtained, and extrusion molding can be carried out in an isostatic environment at an extremely high pressure (approximately −1000 MPa).

As a production sequence of the electrode terminal 1, a source material for positive electrode 11A (metal source material) made of the same metal as of the plus output terminal of the battery cell 2 and a source material for negative electrode 10A (metal source material) made of the same metal as of the minus output terminal of the battery cell 2 are first prepared. In other words, the source material for positive electrode 11A is aluminum or aluminum alloy, and the source material for negative electrode 10A is copper or copper alloy. Then, a billet (source material facing each other) in a round shaft shape structured so that the source material for positive electrode 11A surround the source material for negative electrode 10A in a shaft shape is formed.

For example, the source material for negative electrode 10A is formed as a round shaft member, the source material for positive electrode 11A is formed as a hollow pipe member, and the source material for positive electrode 11A is externally fit and inserted over the source material for negative electrode 10A, thereby forming the billet. Alternatively, the source material for negative electrode 10A is formed as a round shaft member, the source material for positive electrode 11A is formed as a belt-shape member, and the source material for positive electrode 11A is wound over the source material for negative electrode 10A, thereby forming the billet.

Then, the billet is loaded in the extrusion device 30, and the extrusion device 30 is actuated in the isostatic environment at an extremely high pressure (−1000 MPa). As described before, the billet has such a structure that the source material for positive electrode 11A surrounds the source material for negative electrode 10A, and the source material for positive electrode 11A and the source material for the negative electrode 10A are extruded in parallel.

As shown in FIG. 4, an opening area of the die 31 of the extrusion device 30 is smaller than a cross sectional area of the billet, the billet is compressed over the whole circumference, and is plastically deformed by causing the billet to pass through the die 31. Mating surfaces of both the source materials 10A and 11A come out of the die 31, and then form "the interface (metallically bonded portion) between the outer peripheral surface of the shaft 10 and the inner peripheral surface of the outer cylinder 11".

This extrusion processing forms a formed body 1A in an inner/outer double-shaft configuration in which the source material for positive electrode 11A and the source material for negative electrode 10A are integrally bonded by means of the metallic bonding.

The formed body 1A acquired in this way is cut in the extruded direction at a predetermined interval. According to the first embodiment, the die 31 of the extrusion device 30 is formed into an opening shape corresponding to a cross sectional shape of the electrode terminal 1, and the cut interval of the formed body 1A is set to match the length dimension of the electrode terminal 1.

After the cut, a turning process and a male thread cutting process are applied to the source material for positive electrode 11A, thereby forming the male thread portion 13, forming the base portion 12, and forming the protruded portion of the shaft 10, resulting in completion of the electrode terminal 1. A surface grinding and a surface treatment may be applied according to necessity.

Second Embodiment

Figure 5A:
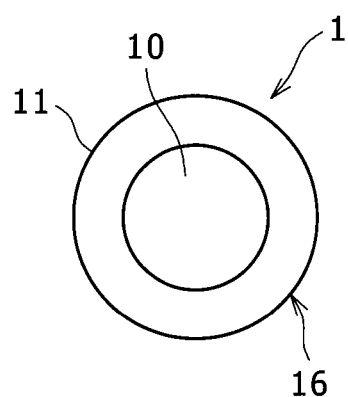
FIG. 5A A plan view of the electrode terminal according to a second embodiment.
Figure 5B:
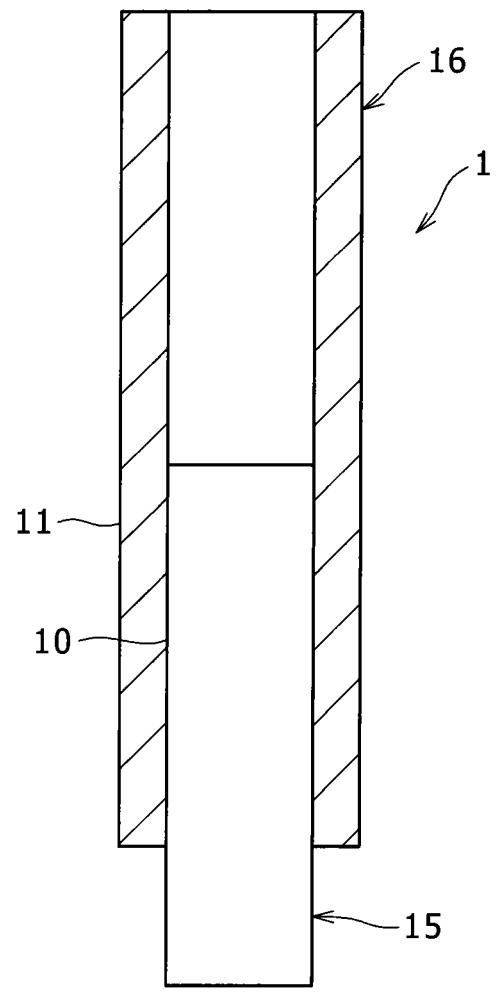
FIG. 5B A front view of the electrode terminal according to the second embodiment.
Figure 6:
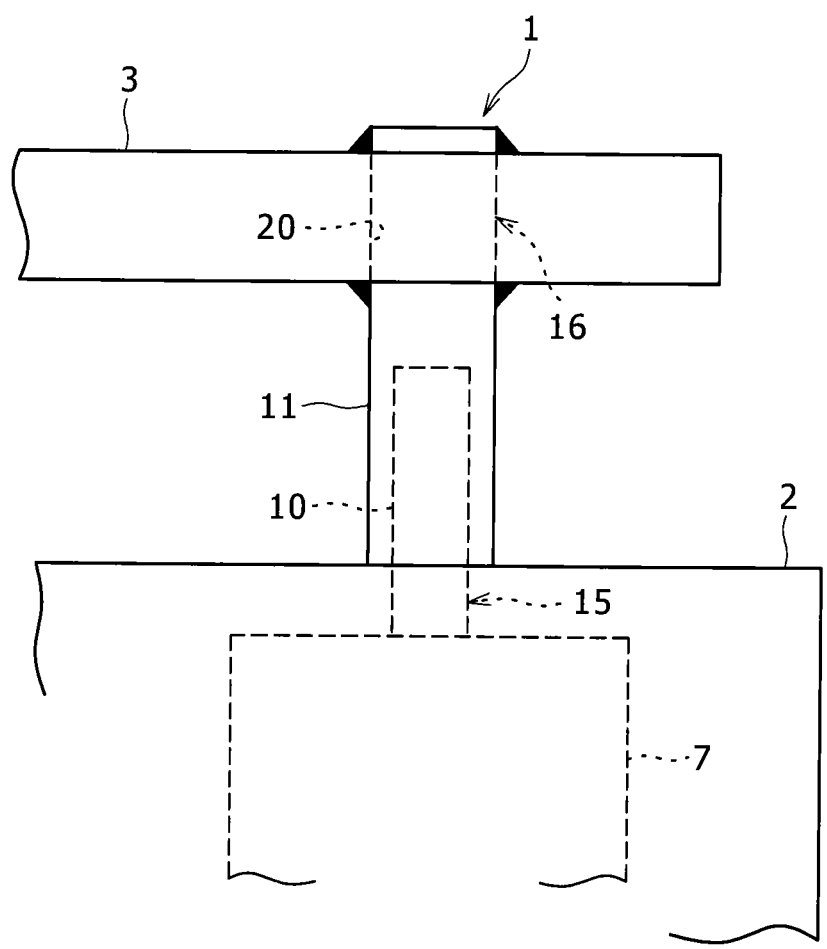
FIG. 6 A connection state of the electrode terminal according to the second embodiment and a busbar.

FIG. 5A, FIG. 5B, and FIG. 6 show a second embodiment of the electrode terminal 1 according to the present invention.

The electrode terminal 1 according to the second embodiment is also adopted as the minus output terminal of the battery cell 2.

As shown in FIG. 5A and FIG. 5B, the outer cylinder 11 of the electrode terminal 1 is formed to extend upward exceeding the length of the shaft 10. In other words, the shaft 10 is not present inside the extended portion of the outer cylinder 11, and is thus hollow. On the other hand, the shaft 10 of the electrode terminal 1 is formed to extend downward exceeding the length of the outer cylinder 11. In addition, the base portion 12 and the male thread portion 13 are not provided on the outer cylinder 11, and the outer cylinder 11 is thus formed into a straight cylindrical shape.

It should be noted that the point that the shaft 10 is the same metal (copper or copper alloy) as of the negative-electrode-side carrier 7 of the battery cell 2, and the outer cylinder 11 is the same metal (aluminum or aluminum alloy) as of the positive-electrode-side carrier and the plus output terminal of the battery cell 2 is the same as that of the first embodiment. Moreover, the point that the outer peripheral surface of the shaft 10 and the inner peripheral surface of the outer cylinder 11 are metallically bonded by the die processing in the isostatic environment at an extremely high pressure is the same as that of the first embodiment.

On the electrode terminal 1 according to the second embodiment, the portion of the shaft 10 protruding from the outer cylinder 11 is attached to the battery cell 2 as the internal connection portion 15, and then, the hollow portion of the outer cylinder 11 is used as the external connection portion 16. In other words, one end portion of the busbar 3 is connected to the external connection portion 16 by means of welding.

Specifically, as shown in FIG. 6, the connection hole 20 of the busbar 3 is inserted over the external connection portion 16 (corresponding to the hollow portion) of the electrode terminal 1, and a periphery of the external connection portion 16 passing out the connection hole 20 may be welded by welding. Both the busbar 3 and the external connection portion 16 of the welded portion are formed from aluminum or aluminum alloy, are the same metal, do not generate eutectic, and the electric resistance therebetween is not excessive.

As shown in FIG. 4, in order to produce the electrode terminal 1 according to the second embodiment, as in the first embodiment, the extrusion device 30 is actuated in the isostatic environment at an extremely high pressure, thereby forming the formed body 1A, and the outer cylinder 11 is then hollowed by boring (the shaft 10 is removed to a predetermined depth).

According to the second embodiment, other configuration, actions and effects, and the production method are the same as those of the first embodiment, and therefore are not detailed.

By the way, it should be understood that the disclosed embodiments are examples in terms of all the points, and are not limitative. The scope of the present invention is not represented by the above description but by CLAIMS, and it is intended that connotation equivalent to the scope of CLAIMS, and all changes within the scope of CLAIMS are included.

For example, according to the first and second embodiments, though the electrode terminal 1 used as the minus output terminal is exemplified, the electrode terminal may be adopted to the plus output terminal. In this case, preferably, the shaft 10 is formed from the same metal (aluminum or the aluminum alloy) as of the positive-electrode-side carrier of the battery cell 2, and the outer cylinder 11 is formed from the same metal (copper or copper alloy) as of the negative-electrode-side carrier 7 of the battery cell 2. The busbar 3 is formed from copper or copper alloy.

Moreover, the busbar 1 according to the present invention is highly preferred for the connection of the lithium ion batteries to be installed on an automobile, and application to connection of the lithium ion batteries used for other applications poses no problem.

The present application is described in detail referring to the specific embodiments, and it is apparent to a person skilled in the art that various changes and modification can be made without departing from the spirit and scope of the present invention.

The present application is based on Japanese Patent Application No. 2010-075916 filed on May 29, 2010, and the contents thereof are incorporated herein by reference.

REFERENCE SIGNS LIST

1: Electrode terminal
1A: Formed body
2: Battery cell
3: Busbar
4: Battery pack
7: Negative-electrode-side carrier
10: Shaft
10A: Source material for negative electrode
11: Outer cylinder
11A: Source material for positive electrode
12: Base portion
13: Male thread portion
15: Internal connection portion
16: External connection portion
20: Connection hole
21: Nut
23: Base portion
24: Male thread portion
30: Extrusion device
31: Die

The invention claimed is:

1. An electrode terminal for electric power output used for a battery having a pair of output terminals formed from metals dissimilar to each other, comprising:
 a first connection portion attaching to one output terminal, and formed from the same metal as of the one output terminal; and
 a second connection portion connected to the first connection portion, and formed from the same metal as of the other output terminal,
 wherein the first connection portion and the second connection portion are unified by metallic bonding,
 wherein the first connection portion is a shaft in a solid cylindrical shape;
 the second connection portion is an outer cylinder in a cylindrical shape fit over the shaft, and
 wherein:
 the shaft is formed from aluminum or aluminum alloy; and
 the outer cylinder is formed from copper or copper alloy.

2. An electrode terminal for electric power output used for a battery having a pair of output terminals formed from metals dissimilar to each other, comprising:
 a first connection portion attaching to one output terminal, and formed from the same metal as of the one output terminal; and
 a second connection portion connected to the first connection portion, and formed from the same metal as of the other output terminal,
 wherein the first connection portion and the second connection portion are unified by metallic bonding,
 wherein the first connection portion is a shaft in a solid cylindrical shape;
 the second connection portion is an outer cylinder in a cylindrical shape fit over the shaft, and
 wherein:
 the shaft is formed from copper or copper alloy; and
 the outer cylinder is formed from aluminum or aluminum alloy.

3. A method for producing an electrode terminal for electric power output used for a battery having a pair of output terminals formed from metals dissimilar to each other, the electrode terminal comprising a first connection portion attaching to one output terminal, and formed from the same metal as of the one output terminal, and a second connection portion connected to the first connection portion, and formed from the same metal as of the other output terminal, wherein the first connection portion and the second connection portion are unified by metallic bonding, wherein the first connection portion is a shaft in a solid cylindrical shape and the second connection portion is an outer cylinder in a cylindrical shape fit over the shaft, the method comprising:
 providing source materials facing each other in a state in which a metal source material forming the outer cylinder is wound so as to surround a metal source material forming the shaft; and
 applying an extrusion process or a drawing process to the source materials facing each other by means of a die in a hydrostatic pressure environment at a high pressure.

* * * * *